United States Patent
Bender et al.

(10) Patent No.: US 11,361,769 B2
(45) Date of Patent: Jun. 14, 2022

(54) ASSESSING ACCURACY OF AN INPUT OR REQUEST RECEIVED BY AN ARTIFICIAL INTELLIGENCE SYSTEM

(71) Applicant: International Business Machines Corporation, Armonk, NY (US)

(72) Inventors: Michael Bender, Rye Brook, NY (US); Sarbajit K. Rakshit, Kolkata (IN); Martin G. Keen, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 16/674,489

(22) Filed: Nov. 5, 2019

(65) Prior Publication Data
US 2021/0134299 A1 May 6, 2021

(51) Int. Cl.
| | | |
|---|---|---|
| *G10L 17/00* | (2013.01) | |
| *G06F 16/9535* | (2019.01) | |
| *G06N 5/04* | (2006.01) | |
| *G10L 17/04* | (2013.01) | |
| *G06F 16/23* | (2019.01) | |
| *G06N 20/00* | (2019.01) | |

(52) U.S. Cl.
CPC .......... *G10L 17/00* (2013.01); *G06F 16/2365* (2019.01); *G06F 16/9535* (2019.01); *G06N 5/04* (2013.01); *G10L 17/04* (2013.01); *G06N 20/00* (2019.01)

(58) Field of Classification Search
CPC ... G10L 17/00; G10L 15/22; G10L 2015/227; G10L 2015/223; G06F 16/2365; G06F 16/24522; G06F 16/2452; G06F 3/16; G06F 3/167; G06F 16/23; G06F 16/9535; G06N 5/045; G06N 5/04; G06N 20/00
See application file for complete search history.

(56) References Cited

U.S. PATENT DOCUMENTS

| | | |
|---|---|---|
| 6,920,420 B2 | 7/2005 | Lin |
| 7,219,050 B2 | 5/2007 | Ishikawa |
| 7,333,928 B2 | 2/2008 | Wang |

(Continued)

OTHER PUBLICATIONS

Mell et al., "The NIST Definition of Cloud Computing", National Institute of Standards and Technology, Special Publication 800-145, Sep. 2011, 7 pages.

(Continued)

*Primary Examiner* — Huyen X Vo
(74) *Attorney, Agent, or Firm* — Michael A. Petrocelli

(57) ABSTRACT

The present disclosure includes analyzing a voice command or request from a user, received at an Artificial Intelligence (AI) system, for identifying a possibly incorrect or misunderstood voice command or request. A first user is identified and associated to a first user profile, in response to receiving an audio input, including a question or command, at an AI system. A possible defect or error is identified, in whole or in part, of the question or the command, based on the first profile of the first user and a knowledge corpus. A response by the AI system is determined based on the analysis of the content and the user profile for the first user. A possible alternative content is generated, in whole or in part, for the question or the command, and communicated the response including the possible alternative content to the first user.

20 Claims, 9 Drawing Sheets

(56) References Cited

U.S. PATENT DOCUMENTS

| | | | |
|---|---|---|---|
| 8,050,912 B1 | 11/2011 | Pearce | |
| 10,170,102 B2 | 1/2019 | Bostick | |
| 2004/0044516 A1* | 3/2004 | Kennewick | G10L 15/22 |
| | | | 704/5 |
| 2009/0144050 A1 | 6/2009 | Lewis | |
| 2015/0255067 A1* | 9/2015 | White | G10L 15/26 |
| | | | 704/235 |
| 2015/0278285 A1* | 10/2015 | Meng | G06F 16/24578 |
| | | | 707/690 |
| 2017/0097984 A1 | 4/2017 | Haldar | |
| 2017/0099249 A1 | 4/2017 | Kozareva | |
| 2018/0210973 A1 | 7/2018 | Mandal | |
| 2018/0286386 A1 | 10/2018 | Baughman | |

OTHER PUBLICATIONS

Smith, Chris, "9 common Amazon Echo problems—and how to fix them quickly", Trusted Reviews, Mar. 8, 2019, 8 pages, <https://www.trustedreviews.com/opinion/amazon-echo-problems-2946622>.

* cited by examiner

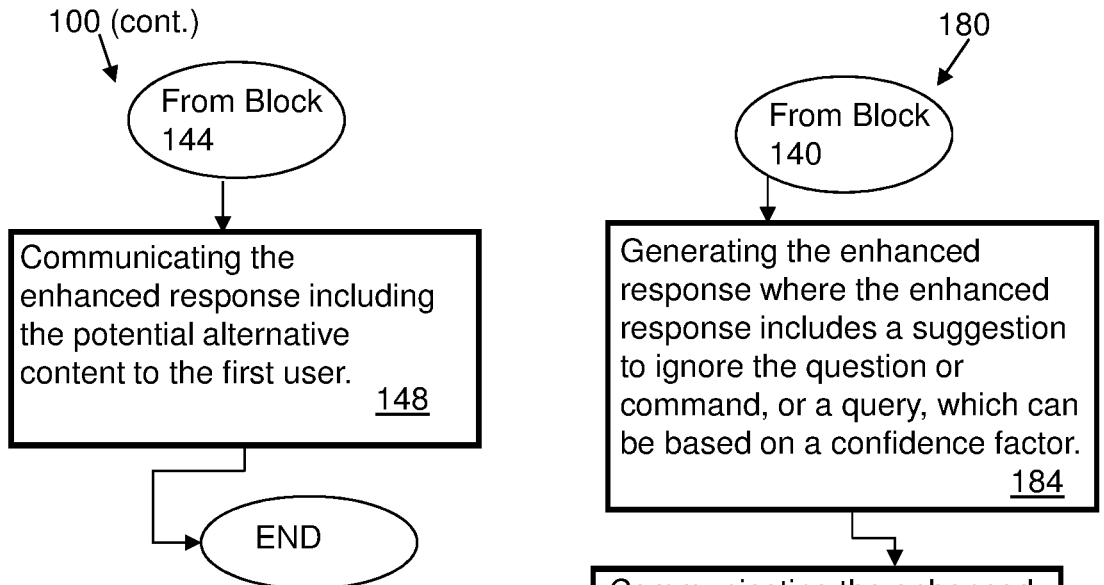
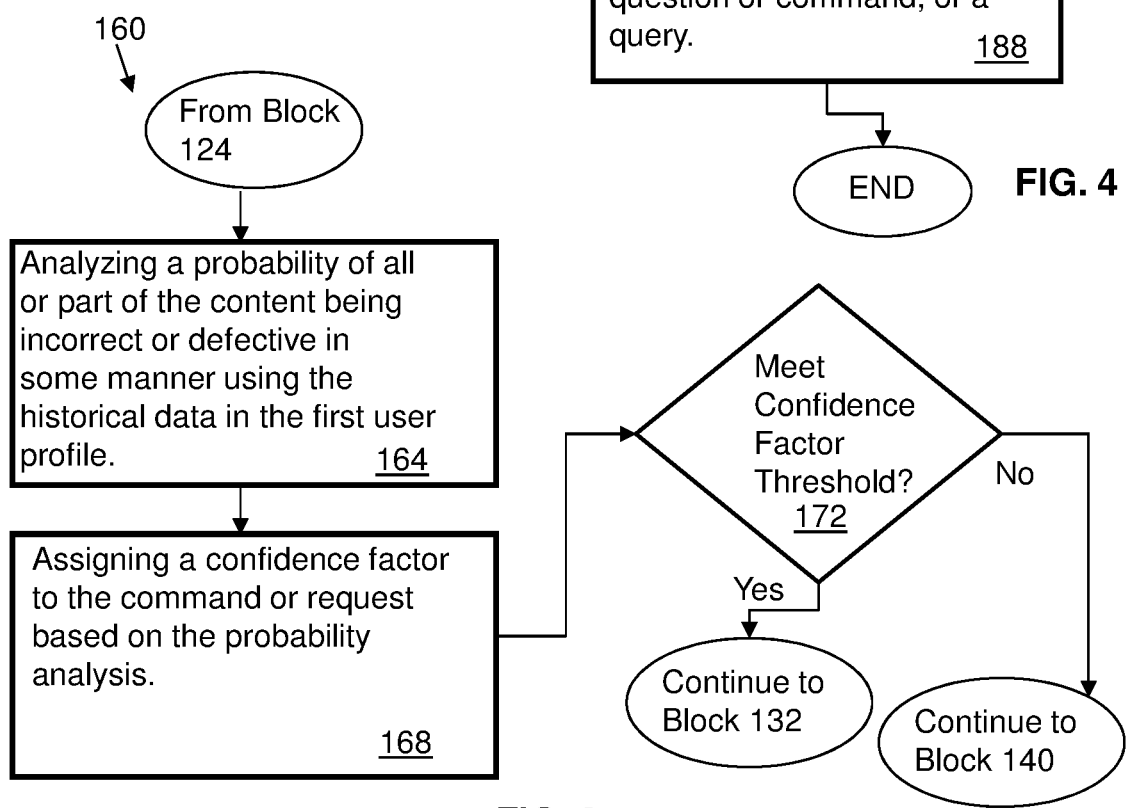
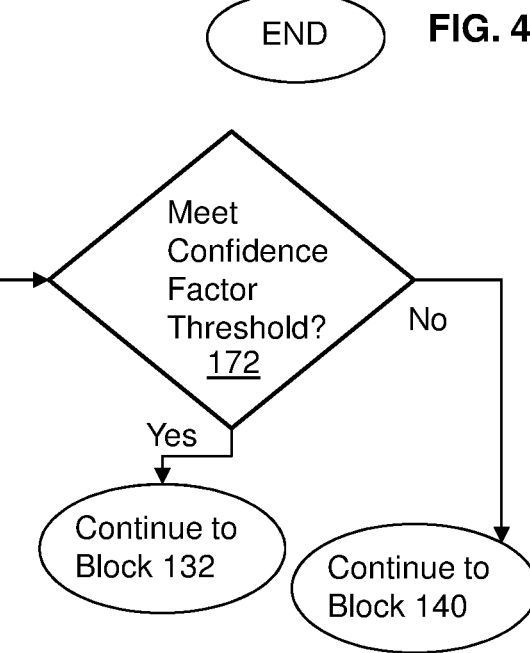
FIG. 2 (Cont.)
FIG. 3
FIG. 4

US 11,361,769 B2

ASSESSING ACCURACY OF AN INPUT OR REQUEST RECEIVED BY AN ARTIFICIAL INTELLIGENCE SYSTEM

BACKGROUND

The present disclosure relates to Artificial Intelligence (AI) systems which respond to a user input such as a query or command, and more particularly, the present disclosure relates to analyzing the user input using the AI system to assess accuracy of the received input.

Artificial Intelligence (AI) based voice response systems, whether on a mobile device or a counter top unit are becoming increasingly popular. Typically, one or more users can interact with an AI device, providing input, to receive information or an action by the AI system (e.g., a question, a command). The AI system can respond to commands, questions, request for information (e.g., weather reports) etc., initiated by a user, and the AI system can provide information or an action based on the user input/interaction, e.g., question or command.

Interaction with an AI device can include some historical data of questions and answers involving one or more users, such as ordering information or general history of queries. However, one issue with current systems includes improving AI interaction with a user or users. In one example, an AI system may not receive an audible request by a user accurately. In one example, the AI system may not receive the question or request by the user accurately.

SUMMARY

The present disclosure recognizes the shortcomings and problems associated with current AI systems being unable to assess the accuracy of a command or request by a user.

In one example, current AI system do not account for an inaccurate, or mistaken request by a user. In another example, a user may quickly correct themselves and thereby seemingly make two requests.

In one embodiment according to the present invention an AI system or AI voice response an AI system can assess a user input, e.g., a request or command, determine a possible error or discrepancy, and generate and communicate a modified response. The response may include communicating a query for more information, and/or additional alternative information.

In one aspect according to the present invention, a method for analyzing a voice command or request from a user, received at an Artificial Intelligence (AI) system, for identifying a possibly incorrect or misunderstood voice command or request includes identifying a first user and associating the first user to a first user profile, in response to receiving an audio input at an AI system from the first user. The AI system includes a control system and the control system stores the first user profile which includes data about the user in a knowledge corpus wherein the knowledge corpus includes historical data for the first user of a plurality of users. Content of the audio input is analyzed to identify a question or command. The method includes identifying a possible defect or error, in whole or in part, of the question or the command, based on the first profile of the first user and the knowledge corpus. The method includes determining a response by the AI system based on the analysis of the content and the user profile for the first user. The method further includes generating possible alternative content, in whole or in part, for the question or the command when the determination for the response based on the analysis includes alternative content, and communicating the response including the possible alternative content to the first user.

In another aspect according to the present invention, a system for analyzing a voice command or request from a user, received at an Artificial Intelligence (AI) system, for identifying a possibly incorrect or misunderstood voice command or request is disclosed. The computer system includes: a computer processor, a computer-readable storage medium, and program instructions stored on the computer-readable storage medium being executable by the processor, to cause the computer system to: identify a first user and associate the first user to a first user profile, in response to receiving an audio input at an AI system from the first user, the AI system includes a control system and the control system stores the first user profile which includes data about the user in a knowledge corpus wherein the knowledge corpus includes historical data for the first user of a plurality of users; analyze the audio input to identify a question or command; identify a possible defect or error, in whole or in part, of the question or the command, based on the first profile of the first user and the knowledge corpus; determine a response by the AI system based on the analysis of the content and the user profile for the first user; generate possible alternative content, in whole or in part, for the question or the command when the determination for the response based on the analysis includes alternative content, and communicate the response including the possible alternative content to the first user.

In another aspect according to the present invention, a computer program product for analyzing a voice command or request from a user, received at an Artificial Intelligence (AI) system, for identifying a possibly incorrect or misunderstood voice command or request is disclosed. The computer program product comprising a computer readable storage medium having program instructions embodied therewith, wherein the computer readable storage medium is not a transitory signal per se, the program instructions executable by a computer to cause the computer to perform a method, comprising: identifying a first user and associating the first user to a first user profile, in response to receiving an audio input at an AI system from the first user, the AI system including a control system and the control system storing the first user profile which includes data about the user in a knowledge corpus wherein the knowledge corpus includes historical data for the first user of a plurality of users; analyzing content of the audio input to identify a question or command; identifying a possible defect or error, in whole or in part, of the question or the command, based on the first profile of the first user and the knowledge corpus; determining a response by the AI system based on the analysis of the content and the user profile for the first user; generating possible alternative content, in whole or in part, for the question or the command when the determination for the response based on the analysis includes alternative content; and communicating the response including the possible alternative content to the first user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

FIG. 3 is a flow chart illustrating a method, according to another embodiment of the invention which is a variation of the method shown in FIG. 2.

FIG. 4 is flow chart illustrating a method, according to another embodiment of the invention which is another variation of the method shown in FIG. 2.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Figure 1:
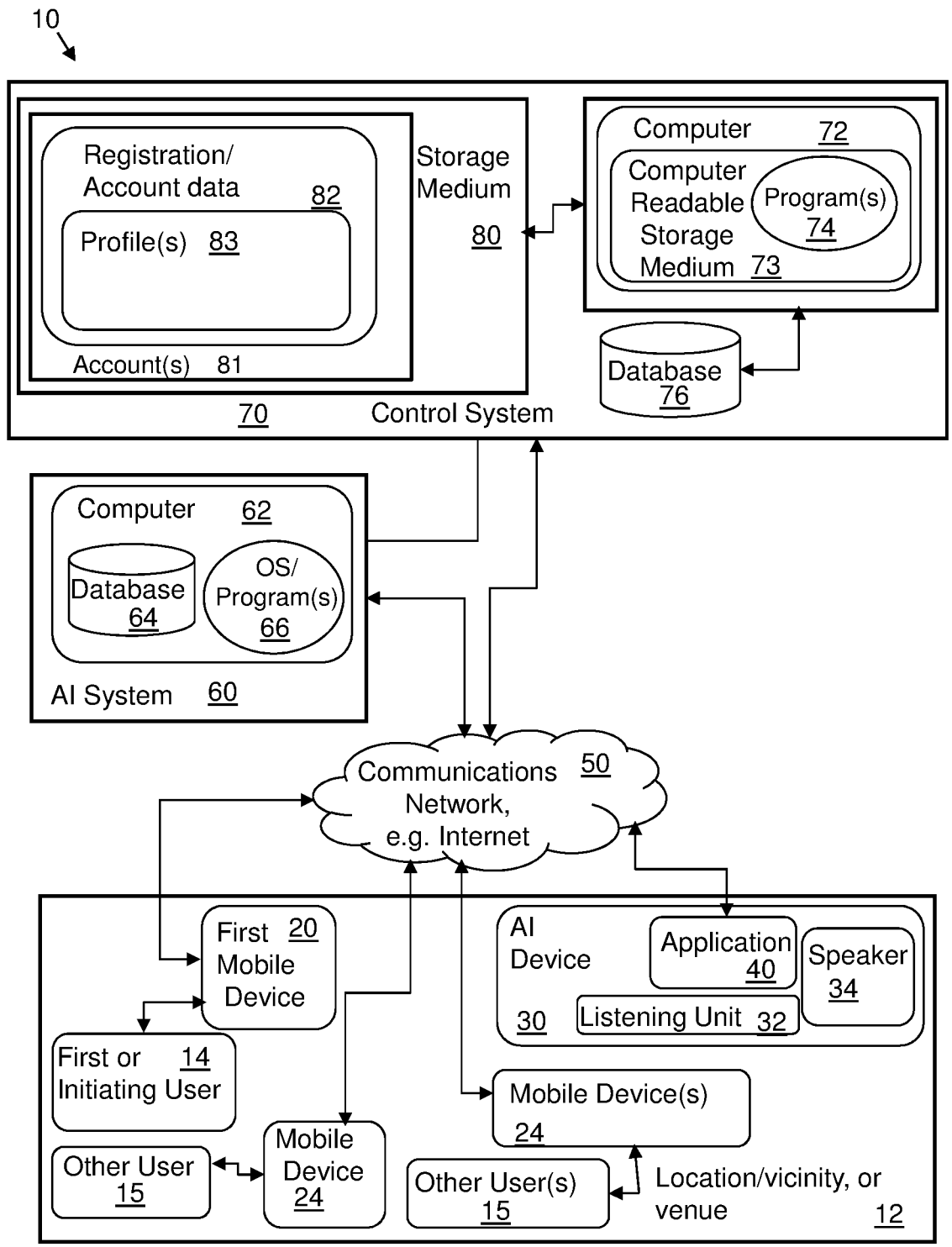
FIG. 1 is a schematic block diagram illustrating an overview of a system and methodology for analyzing a voice command or request from a user, received at an Artificial Intelligence (AI) system, for identifying a possibly incorrect or misunderstood voice command or request, according to an embodiment of the invention.
Figure 2:
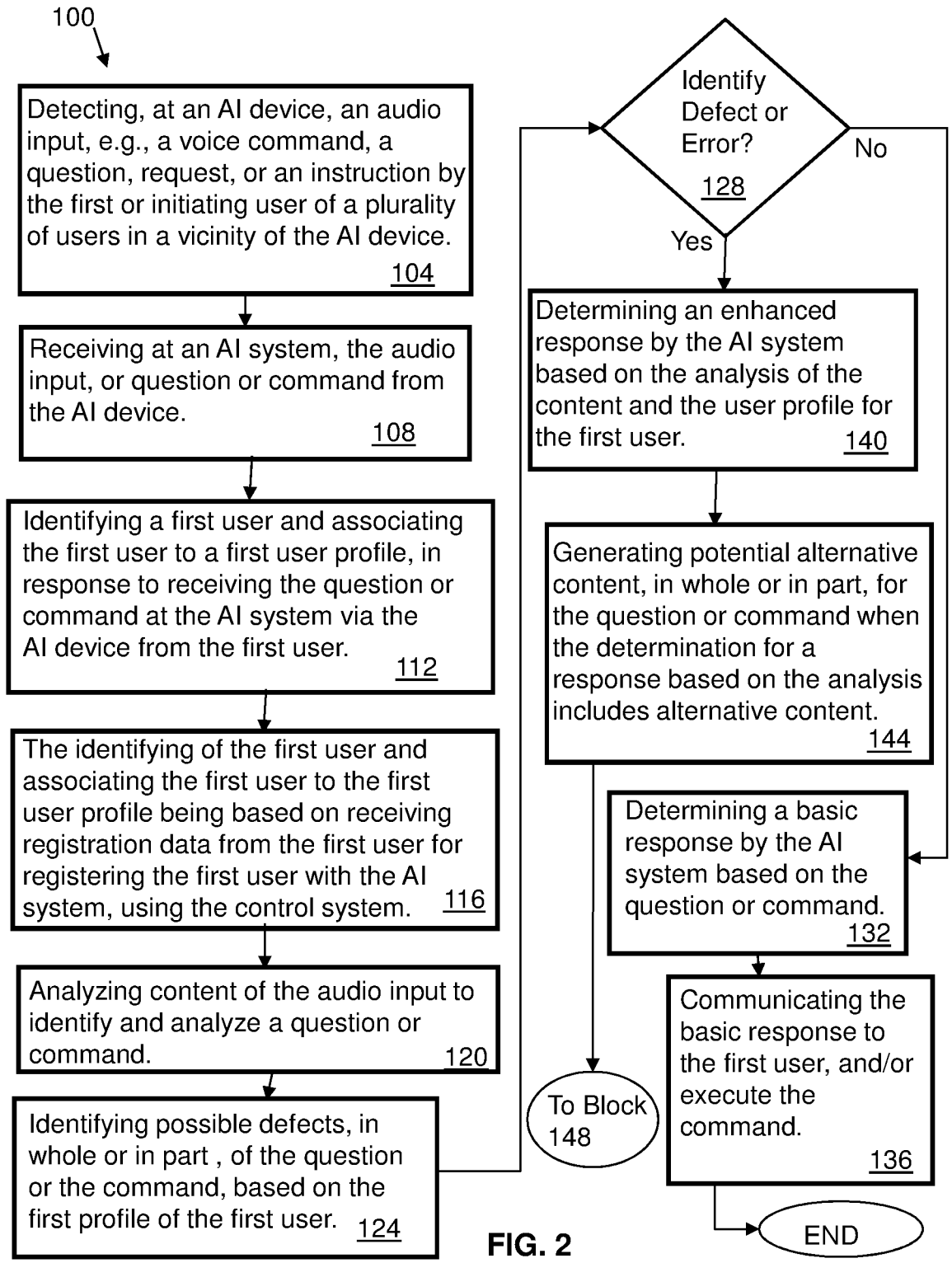
FIG. 2 is a flow chart illustrating a method, implemented using the system shown in FIG. 1, for analyzing a voice command or request from a user, received at an Artificial Intelligence (AI) system, for identifying a possibly incorrect or misunderstood voice command or request, according to an embodiment of the present invention.

Referring to FIGS. 1 and 2, a method 100 (FIG. 2) with reference to a system 10 (FIG. 1) according to an embodiment of the present disclosure is provided for analyzing an audio input, for example, a voice command or request, received at an Artificial Intelligence (AI) system, from a user for identifying a possibly incorrect or misunderstood voice command or request. In one embodiment according to the present disclosure, an AI device 30, mounted or free standing, belonging to a first user (also referred to as an initiating user) communicates with an AI system 60. The AI device is situated in a location or vicinity or venue 12, which descriptions are used interchangeably and understood to refer to the same thing. Such a location can be, for example, a user's house having the AI device at a location in the house, for example, on a countertop or table. The AI device can be always active and/or activated by voice commands, that is, the AI device listens, using a listening unit 32, e.g., a microphone, for a specific voice command, such as "hello 'blank'" or "hello 'device name'". The AI device can also include a speaker 34 for transmitting an audible reply, such as a voice simulation. The AI system 60 can operate on a specific or proprietary AI platform, wherein the platform enables the AI system and associated AI devices to communicate.

In one embodiment, an AI device can be a mobile device which accesses an AI system, for example, via the Internet. In this example, the vicinity or location would be a location of the mobile device and the vicinity would be an area around the mobile device, such as the area within audible range of the device.

Also, referring to FIG. 1, the AI system 60 includes a computer 62, database 64, and operating systems and programs 66. Referring to FIGS. 1 and 2, the method and system includes being capable of detecting and identifying devices belonging to the first user 14 and a plurality of other users 15 in a location or venue 12. The devices can electronically communicate and interact with the AI system 60 via the AI device 30. Referring to FIG. 1, the user 14 in the location 12 can ask a question 304 (see FIG. 6), make a request, or give an instruction, audibly, to the AI device 30.

In the present example, a first user 14 and multiple other users 15 are shown for illustration, however, other users can be at the location. Other user devices, other than a mobile device can include, for example, a computer, a laptop computer, or a desktop computer, or a tablet having a computer. In one example, a first user 14 can have a first mobile device 20. In another example, other users 15 can have associated mobile devices 24.

A control system is in communication with the AI device 30 and the AI system 60. The AI device 30 includes an application 40. In another example, a plurality of users can be at the location 12 and one or more users can ask a question. The AI device 30 communicates with the AI system 60 and the control system 70 using a communications network 50 (e.g. the Internet).

Also, referring to FIG. 1, a user's electronic device, e.g., a mobile device 20 can include a computer, computer readable storage medium, and operating systems, and/or programs, and/or a software application. These features are shown generically herein in FIG. 7 referring to one or more computer systems 1010.

The method 100 according to an embodiment of the present disclosure, can be incorporated in one or more computer programs or an application and stored on an electronic storage medium. It is envisioned that the application can access all or part of instructions necessary to implement the method of the present disclosure. The program or application can communicate with a remote computer system via a communications network 50, e.g., the Internet, and access data, and cooperate with program(s) stored on the remote computer system.

In the embodiment of the disclosure shown in FIGS. 1 and 2, the method 100 is incorporated in an application 40 stored on the AI device 30. The application can be in communication with a control system 70 via the communications network 50. The control system 70 includes a computer 72 having a database 76 and one or more programs 74. In the embodiment of the disclosure shown in FIG. 1, the application 40 communicates with the control system 70 and the one or more programs 74 stored on a computer readable storage medium 73. The control system includes the computer 72 which also has access to the database 76. The control system 70 includes a storage medium 80 for maintaining a registration 82 of users and their devices for collaboration with the AI system 60. Such registration can include user profiles 83, which can include user data supplied by the users in reference to registering and setting-up an account. In an embodiment, the method and system which incorporates the present disclosure includes the control system (generally referred to as the back-end) in combination and cooperation with a front end of the method and system, which can be the application. The application is stored on a device, for example, the AI device 30, and can access data and additional programs at a back end of the application, e.g., control system 70.

In one embodiment of the present disclosure, the control system 70 includes a storage medium 80 for maintaining a registration and account data 82 of accounts 81. The registration and account data 82 can include associated profiles 83. The control system can also be part of a software application implementation, and/or represent a software application having a front-end user part and a back-end part providing functionality. In an embodiment, the method and system which incorporates the present disclosure includes the control system (which can be generally referred to as the back-end of the software application which incorporates a part of the method and system of an embodiment of the present application) in combination and cooperation with a front end of the software application incorporating another part of the method and system of the present application at the AI device, as in the example shown in FIG. 1 of AI device 30 having the application 40. The application 40 is stored on the AI device 30 and can access data and additional programs at the back end of the application, for example, in the program(s) 74 stored in the control system 70.

The program(s) 74 can include, all or in part, a series of executable steps for implementing the method of the present disclosure. A program, incorporating the present method, can be all or in part stored in the computer readable storage medium on the control system or, in all or in part, on an AI device 30. It is envisioned that the control system 70 can not only store the profile of users, but in one embodiment, can interact with a website for viewing on a display of a device using the Internet, and receive user input related to the method and system of the present disclosure. It is understood that FIG. 1 depicts one or more profiles 83, however, the method can include multiple profiles, users, registrations, etc. It is envisioned that a plurality of users or a group of users can register and provide profiles using the control system for use according to the method and system of the present disclosure.

Regarding any collection of data with respect to the present disclosure, such uploading or generation of profiles is voluntary by the one or more users, and thus initiated by and with the approval of a user. Thereby, a user can opt-in to establishing an account 81 having a profile 83 according to the present disclosure. Such approval also includes a user's option to cancel such profile or account, and thus opt-out, at the user's discretion, of capturing communications and data. Further, any data stored or collected is understood to be intended to be securely stored and unavailable without authorization by the user, and not available to the public and/or unauthorized users. Such stored data is understood to be deleted at the request of the user and deleted in a secure manner. Also, any use of such stored data is understood to be, according to the present disclosure, only with the user's authorization and consent.

In one or more embodiments of the present invention, a user(s) can opt-in or register with a control system, voluntarily providing data and/or information in the process, with the user's consent and authorization, where the data is stored and used in the one or more methods of the present disclosure. Also, a user(s) can register one or more user electronic devices for use with the one or more methods and systems according to the present disclosure. As part of a registration, a user can also identify and authorize access to one or more activities or other systems (e.g., audio and/or video systems). Such opt-in of registration and authorizing collection and/or storage of data is voluntary and a user may request deletion of data (including a profile and/or profile data), un-registering, and/or opt-out of any registration. It is understood that such opting-out includes disposal of all data in a secure manner.

It is also understood that the method 100 according to an embodiment of the present disclosure, can be incorporated into (Artificial Intelligence) AI devices, which can communicate with respective AI systems, and respective AI system platforms. Thereby, such programs or an application incorporating the method of the present disclosure, as discussed above, can be part of an AI system. In one embodiment according to the present invention, it is envisioned that the control system can communicate with an AI system, or in another example can be part of an AI system. The control system can also represent a software application having a front-end user part and a back-end part providing functionality, which can in one or more examples, interact with, encompass, or be part of larger systems, such as an AI system. In one example, the AI device 30 is associated with an AI system 60, remote from the AI device. Such an AI system can be represented by one or more servers storing programs on computer readable medium which can communicate with one or more AI devices. The AI system can communicate with the control system, and in one or more embodiments, the control system can be all or part of the AI system or vice versa.

AN EMBODIMENT ACCORDING TO THE PRESENT DISCLOSURE

Figure 6:
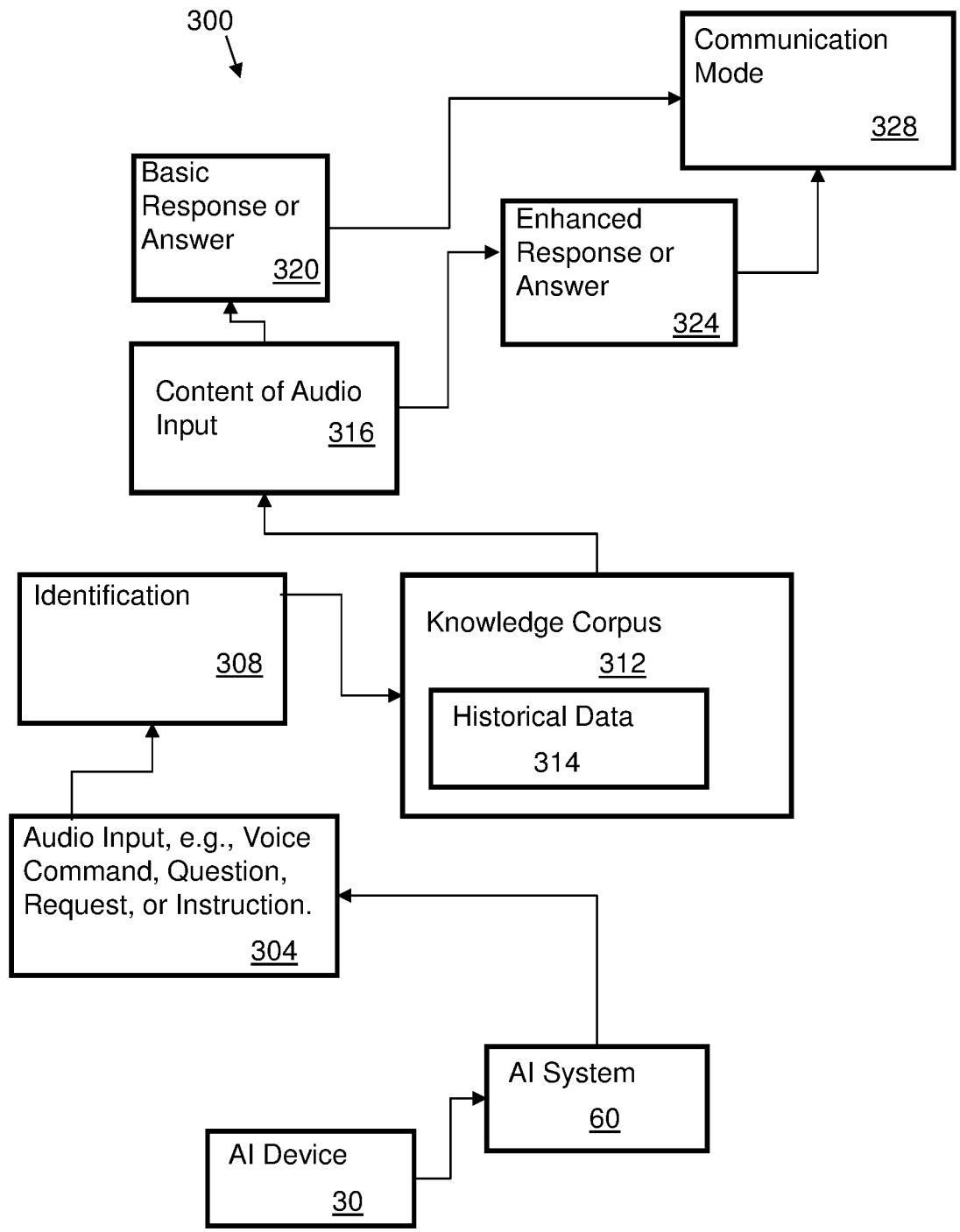
FIG. 6 is a functional block diagram for instructional purposes illustrating features of the present invention in association with the embodiments shown in FIGS. 1, 2, 3, 4, and 5 for analyzing a voice command or request from a user, received at an Artificial Intelligence (AI) system, for identifying a possibly incorrect or misunderstood voice command or request, according to embodiments of the invention.

Referring to FIG. 2, a computer-implemented method is disclosed for analyzing a voice command or request, received at an Artificial Intelligence (AI) system 60 from an AI device 30, from a first user 14 for identifying a possibly incorrect or misunderstood voice command or request 304 (see FIG. 6). The method 100, using the system 10, detects an audio input, for example, a voice command, and/or receives a question, command, request, or an instruction 304 (see FIG. 6) from the first or initiating user 14 of a plurality of users in a vicinity 12 of the AI device 30, as in block 104. In one example, the AI device 30 detects and receives an audible question by a user, or a wake-up command to the AI device. The AI device can activate upon detecting a voice command at its listening unit 32. In response to detecting the voice command and activating, the AI device receives the question or command by the user. In another example, the audible input can be from one or another user of the plurality of users.

It is understood that the features shown in FIG. 6 are functional representations of features of the present disclosure. Such features are shown in the embodiment 300 of the system and method of the present disclosure for illustrative purposes to clarify the functionality of features of the present disclosure.

It is understood that as discussed herein, when the present disclosure refers to 'a question' or 'a question or command', or 'instruction', etc., it is intended to include, and not exclude, requests, instructions, and other types of voice activation, but for the sake of expediency the disclosure is referring to a question or command as generic and inclusive of other audible instruction or interactions. In one example, the first user can use a mobile device, for example, a first mobile device 204, which can be used, with consent and permission of the user, to detect a location of the first mobile device and thereby the location of the user. Other examples of AI devices include devices which include a microphone, speaker, and can access the Internet, for example, a vehicle having a computer and having Internet access or cellular or satellite communications, or in another example, IoT (Internet of Things) devices such as appliances.

The method includes receiving the audio input, e.g., a question or command, at an AI system from an associated AI device which received the question or command from the initiating user of a plurality of users in a vicinity 12 of the AI device 30, as in block 108.

The method includes identifying 308 (see FIG. 6) a first user and associating the first user to a first user profile, as in block 112, in response to receiving the question or command 304 at the AI system 60 via the AI device 30 from the first user 14. The AI system includes a control system 70. The control system 70 stores a first user profile 83 which includes data 82 about the first user 14 in a knowledge corpus 312 (see FIG. 6) which can be stored in a database 76. The knowledge corpus 312 includes historical data 314 (see FIG. 6) for the first user 14 and other users 15.

In one example, the historical data includes historical or past communications with the control system for the first user and/or communications with associated devices which share information with the AI system. For example, such associated devices can include Internet of Things devices.

The method can include receiving registration data from the first user for registering the first user with the AI system, using the control system, as in block 116. The identifying of the first user and associating the first user to the first user profile can be based on receiving the registration data from the first user. The registration data can include voice, e.g., voice prints, and/or camera video data, as well as other biometric markers, for example, finger prints.

The method includes analyzing content 316 (see FIG. 6) of the audio input 304 to identify and analyze a question or command, as in block 120.

The method includes identifying possible defects, in whole or in part, of the question or the command, based on the first profile of the first user, as in block 124.

When the method determines, at block 128, that a possibly defect or error does not exist, the method proceeds to block 132, wherein the method determines a basic response 320 by the AI system based on the question or command. The method then includes communicating the basic response 320 to the first user, as in block 136. The communicating can include a communication mode 328 (FIG. 6), for example, an audio output, or a text, or a chatbot to a user device. The basic response is understood to include a response to the question or command, including an action. It is not meant to indicate that there is a limitation to the response, but to distinguish the response from an enhanced response.

When the method determines, at block 128, that a possible defect or error does exist, the method proceeds to block 140, wherein the method determines an enhanced response 324 (see FIG. 6) by the AI system based on the analysis of the content and the user profile for the first user.

The method includes generating possible or potential alternative content, in whole or in part, for the question or command when the determination for the response based on the analysis includes alternative content, as in block 144. The enhanced response includes the alternative content. In one example the alternative content can include a query for confirmation that the AI system received the question or command correctly, and can include potential alternative content for the question or command.

The method then includes communicating the enhanced response including the potential alternative content to the first user, as in block 148.

Other Embodiments and Examples

According to one embodiment of the method and system of the present disclosure can include identification of a defect which can include the use of a confidence factor based on a probability of all or part of the content being incorrect or in error. In one example, referring to FIG. 3, a method 160 continues from block 124 of the method 100 shown in FIG. 2, and includes analyzing a probability of all or part of the content being incorrect or defective in some manner using the historical data in the first user profile, as in block 164. The method assigns a confidence factor to the command or request based on the probability analysis, as in block 168.

When the confidence factor meets a threshold, as determined in block 172, the method continues to block 132 of FIG. 2. When the confidence factor does not meet the threshold, as determined in block 172, the method continues to block 140 of FIG. 2. In one example, when the confidence factor is low or does not meet a threshold, the method response can include a question or query to clarify the question or command.

In another embodiment, referring to FIG. 4, the method and system of the present disclosure can include a method 180 continuing from block 140 of FIG. 2, wherein the method 180 includes generating the enhanced response where the enhanced response includes a suggestion to ignore the question or command based on a confidence factor, as in block 184. The method 180 includes communicating the enhanced response, including the suggestion to ignore the question or command, or can include a query to the user to clarify the input, as in block 188. The method 180 then ends.

In one example, the method 180 can determine whether to generate and communicate an enhanced response with a suggestion to ignore the question or command, or query the user, based on a confidence factor. The confidence factor was discussed above in relation to method 160. The confidence factor can be used such that when the confidence factor is low, or does not reach a specified threshold, the method can generate and communicated a suggestion to ignore, or a query to the user as in blocks 184 and 188 of FIG. 4. The query can be used to ask the user for clarification of their input, and/or to confirm a command.

In another example, according to the methods and systems of the present disclosure, a potential alternative content can include substituting a target one or more words in the content with alternative words. In another example, the substitute one or more words can include rhyming or a similar sounding words in comparison to the target one or more words.

Figure 5:
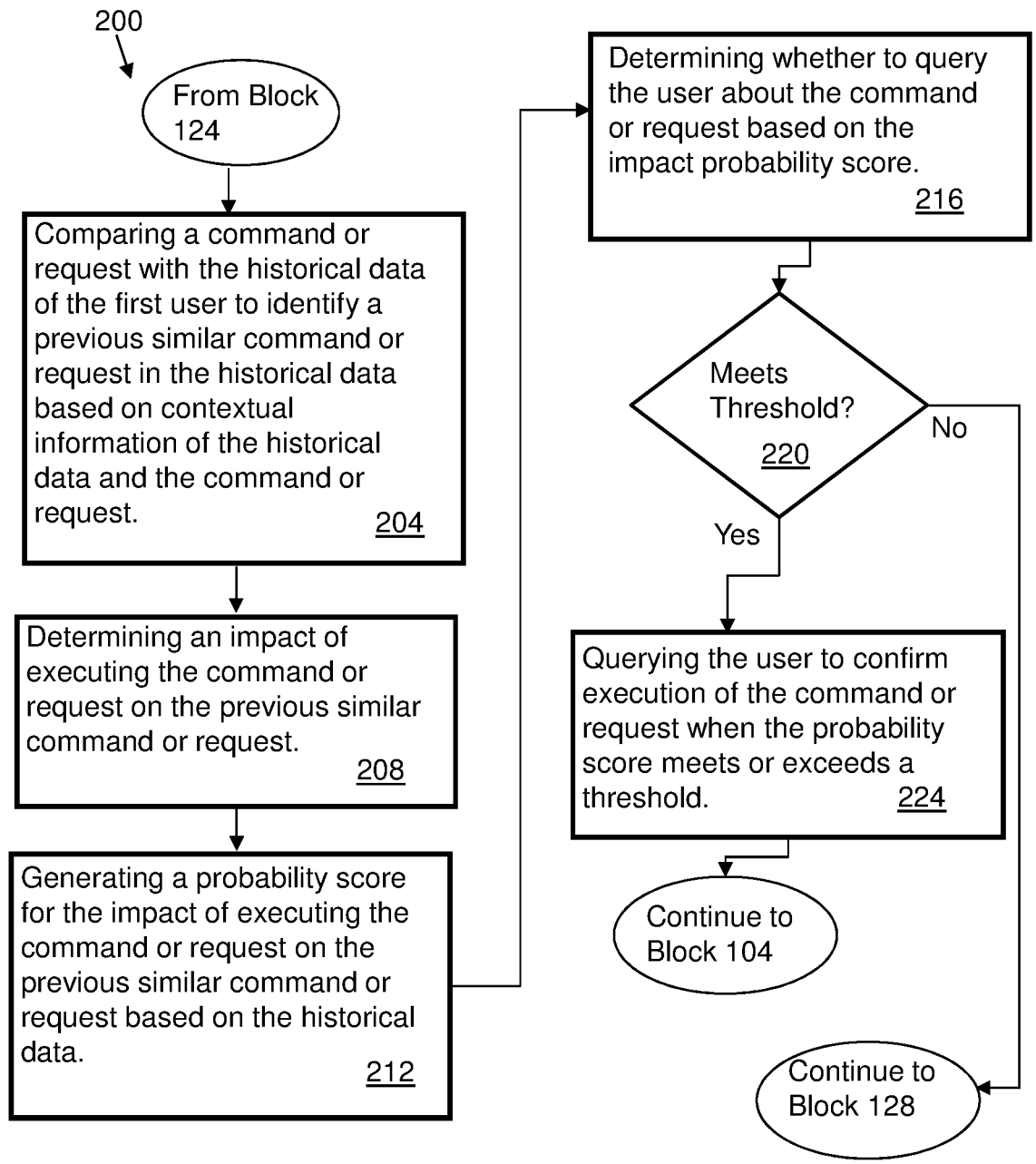
FIG. 5 is flow chart illustrating a method, according to another embodiment of the invention which is another variation of the method shown in FIG. 2.

Referring to FIG. 5, in another example, according to the methods and systems of the present disclosure, a method 200 includes continuing from block 124 of FIG. 2, and includes, comparing a command or request with the historical data of the first user to identify a previous similar command or request in the historical data based on contextual information of the historical data and the command or request, as in block 204. The comparing can be considered as part of identifying possible defects.

The method 200 includes determining an impact of executing the command or request on the previous similar command or request, as in block 208.

The method 200 includes generating a probability score for the impact of executing the command or request on the previous similar command or request based on the historical data, as in block 212. The method includes determining whether to query the user about the command or request based on the impact probability score, as in block 216. When the impact probability score meets or exceeds a threshold, the method continues to query the user to confirm execution of the command or request. Such query can include asking the user to confirm their last request. The method then continues to block 104 of FIG. 2 to listen for a voice command, e.g., an answer (e.g., an audible input from the first user or another user of the plurality of users) to the AI systems question in this case.

When the impact probability score does not meet the threshold, the method continues to block 128 of FIG. 2 to identify any defect or error.

In another example, according to the methods and systems of the present disclosure, the historical data can include Internet of Things (IoT) data received from IoT devices. In another embodiment and example, according to the methods and systems of the present disclosure, the method can include the historical data including Internet of Things (IoT) data received from IoT devices. The method can further include comparing a command or request with the historical data of the first user to identify a previous similar command or request in the historical data based on contextual information of the historical data and the command or request. Such a comparison can be part of identifying a possible defect as in block 124 of FIG. 2. The method can continue by identifying a pattern of requests using the historical data, and identifying when the command or request does not fit the pattern of requests. The method can include determining an alternative action or alternative command or request based on the identification of the pattern of request and the identifying when the command or request does not fit the pattern of requests, and communicating the alternative action to the user. Such alternative action communicated to the user can be part or all of generated alternative content as in blocks 144 and 148 of FIG. 2.

In another embodiment and example, according to the methods and systems of the present disclosure, a method can include receiving data from Internet of Things (IoT) devices, and the IoT data being included in the historical data. The method can identify, based on the historical data including the IoT data an illogical command, the illogical command not meeting requirements for congruity between the request or command and the historical data including the IoT data. Such incongruity can include an action that does not make sense when compared to a present state or future command. For example, if a user instructed the AI system to turn off all the lights in the house at nighttime when company was over. As in the example above, this can be part of identifying possible defects as in block 124 of FIG. 2.

When such an incongruity is detected, the method can include determining an alternative action and/or a response asking for clarification using the AI system, and communicate the alternative action and/or the response asking for clarification to the user. Incongruity and illogical commands can be detecting using the knowledge corpus in conjunction with a set of rules for determining incongruity or conflict with one or more of the rules.

In another embodiment or example according to the present disclosure, the method(s) disclosed herein can be directed to a plurality of users. The method can include a first user as one of a plurality of users, and the method can further include receiving a plurality of questions or commands at an AI system, from a plurality of user, respectively. The method includes identifying each of the users of the plurality of users and associating with their respective user profile of a plurality of profiles. The method includes analyzing content of each of the questions or commands, and determining a response for each of the questions or commands based on the analysis of the content for each of the questions or command and the associated user profile of the plurality of profiles. The method includes generating possible alternative content for one or more of the plurality of questions or commands when the determination for the response for the one or more of the questions or commands based on the analysis includes alternative content, and communicating the responses to the respective users in response to the plurality of questions or commands, respectively.

In another example, the AI system can send a text and/or a chatbot to a respective device for each of the respective users based on the response for each of the questions or commands.

In another example, the AI system can include a listening device, and a speaker for audible communication using a simulated voice.

Other Examples and Embodiments

As described above in the embodiment according the present disclosure, a system and a method is disclosed to leverage machine learning to have the listening device of an AI system identify possible mistakes prior to executing a command or initiating an answer. Possibly incorrect requests, can be identified detecting: a request that is not normally asked from an individual, e.g., a user; a change in voice tone during or after the request (e.g., a user may say "oops I meant . . . "); a reversal of the original request and initiation of a new request after an original request is processed; a request that is illogical based on readings from other sensors (e.g., user requests turning off all lights when multiple people are in the house); and a request when changing a word in the request to a word that sounds similar, could change the meaning of the request (e.g., turn off all lights vs. hall lights). Based on the probability that a request is not intended to be executed, the request could be ignored by the listening device or alternative actions could be suggested through the AE device.

In other examples, a system and method according to the present disclosure can include an AI system which analyzes voice commands from individuals to identify possibly incorrect or misunderstood requests received by the AI system through a listening device. The method and system can include: identifying the individual making a request; identifying patterns of requests from an individual; identifying requests that are changed during the request; identifying requests that are reversed after the request is processed; identifying requests that are inconsistent with the requested activity based on analysis of data from IoT sensors; identifying possible requests that would sound similar to a listening device; ignoring or recommending alternative actions through the listening device based on the probability that a request was not intended.

In another example, user A frequently gets muting and turning his phone off commands mixed up. The AI system can learn that when user A requests his phone to be turned off, he quickly reboots his phone and asks for the phone to put on mute 95% of the time when his battery power is greater than 25%. Thereby, when user A asks for his phone to be turned off, the AI system asks, by voice simulation through a speaker, to confirm that user A didn't mean to mute his phone.

In another example, user B can ask the AI system to turn off the hall light, but as he is finishing the request, he adds the phrase "oops, I didn't mean that". The AI system can analyze the full request, but not process the request even though the system knew what the initial request was, as the AI system has assessed that user B did not intend or did not want the request to be executed.

In another example including smart devices and IoT devices, user C asks the AI system to turn on the Kitchen Oven. His oven named "Kitchen" is in his summer house, not in the house he is currently in. The AI system determines that user C never requests the oven to be turned on when he is not in the house and therefore designates the request as in error and does not execute the command, and/or requests confirmation or clarification from the user C.

In another embodiment according to the present disclosure, an AI system including an AI voice response system can capture a user's voice request, execution log and post execution reaction and correction of any voice command. The AI voice response system can be analyzing various sources of information from the surrounding area or vicinity, for example, biometric data, other device data, such as IoT devices, surrounding noise, calendar data, etc., to identify contextual information, such as a contextual situation related to a submitted voice command. The AI voice response system can gather the post execution reaction of any user's voice request or correction of any voice request. For example, the AI voice response system can track how the user is reacting on any submitted voice request, for instance, is the user submitting any second voice command to override a previously submitted voice command, and how long, or what is the time interval between the voice command and the second correcting voice command.

The AI voice response system can track if a user submits any counter voice command after a period of time, and can validate the same with surrounding context, for example, after a TV program is over or an event such as a theater event is over, the user submits a voice command to restart their mobile phone.

The AI voice response system can gather the above data historically to perform machine learning to identify correlation among submitted voice requests, a user's post execution reaction to a voice command, any correction of the submitted voice command, and if an overriding voice command is received after a specific time period between an initial and a second voice command, as well as identified context etc. Accordingly, a knowledge corpus is created using the above data.

Once the knowledge corpus is created, then AI voice response system, using the created knowledge corpus, can identify if and when a submitted voice command is subsequently corrected by a voice command, or when a user reacts to the voice command differently, for example, by following the command with an expression indicating an error. The knowledge corpus can be used for predicting an intended voice command.

When a voice command is submitted, the AI voice response system can analyze the voice command using the knowledge corpus. Based on the analysis, the AI voice response system can determine or assess the probability of an intended need of the voice command, and accordingly the intended voice command can be executed. When an inappropriate or wrong voice command is detected, the inappropriate or wrong voice command will not be executed.

When a user submits two or more voice command, the AI system can identify the user, and based on the knowledge corpus, including the historical data for the user, the AI voice response system can assess the probability of additional questions and their content, and the validity of the two or more voice commands.

The AI system can communicate a query to the user for clarification, and thereby building and improving the knowledge corpus for the user. Thereby the system and method of the present disclosure can determine if commands requested by a user to am AI listening device may be incorrect, and the AI system can recommend alternatives. For example, the AI system can interpret the request incorrectly, or a request can be based on human error such as the user is requesting a wrong item or giving a wrong command.

The system and method of the present disclosure includes a method identifying an individual or user making a request, so the AI system can determine patterns for the user. The method can identify the speaker by voice analysis, image analysis, device analysis, near field communications or through the user logging into or being logged into an account. The method can include cognitive analysis of the request and other inputs for an individual or user to identify requests that may not be desired. The cognitive analysis can include input from: registered IoT devices connected or associated to an individual. The request can be received at the AI system and compared to other requests based on time and environmental conditions. Also, IoT feeds can be captured and used to see impact to others from the request or to previous requests (e.g., turn oven off right after turning oven temperature up and food is cooking). The AI system can compare requests to previous requests and check for reversing frequency. Also, the system can check for a stop in the middle/end of one or more requests.

Additionally, the AI system can identify phonetically similar words for all parts of the request, and replace words and see if request can be executed. If the replaced command or modified command can be executed, the system can check if a request has been historically requested. If the request is for a device, the AI system can name/contact check against all registered devices and contacts. For each request, the AI system can generate a probability score. Also, the AI system can generate an environmental conditions score based on impact to others. Historical reversals based on cognitive analysis of previous requests, can also be assessed by the AI system. For example, a user request where the user stops in mid-sentence can be assessed as 100% probability of a command given in error, and not executed, and/or the AI system can communicate a query to the user for confirmation. Also, the AI system can user phonetic similarity, based on generating a percent probability of possible alternative commands that can be executed and compared to historical data.

In other example according to the method and system of the present disclosure, the method can recommend alternative actions if the intended request is determined to be questionable or has a probability of being in error. The AI system can determine alternative requests that are possible over a configured threshold. The alternative requests can be based on configured settings. In one example, an AI device can present alternatives to a user to determine which request to execute.

In the embodiments of the present disclosure discussed above, a computer enabled system and method recommends alternative actions or ignoring a request from a use or individual through a listening device of an AI system. The method includes identifying via a computer the individual making the request, and identifying via the computer possible incorrect requests. The method can identify using the AI system, possible alternate requests, and communicate via the AI system alternative options or suggested non-action to the user or individual.

In another example, the method can identify individuals via registration of the users in an AI registration for the AI system. The AI registration can include voice prints, cameras, or communications with other known devices associated with the individual. The method can include assigning a probability of an incorrect request and/or a confidence factor to a request to determine whether a request is in error, in all or in part. Also, the method can identify an incorrect request based on historical requests from the individual. The method can include identifying requests that the individual modifies during and/or immediately after the request. A threshold for modification to be associated with the previous request can be a set time period, such as 1-3 seconds. Thereby when a user issues a correction request or secondary request 1-3 seconds after a first request, the AI system determines that the first request is in error. The method can include identifying requests that are reversed, and initiate a follow up request for clarification from the user.

The method can further include identifying illogical requests, as a result of data analysis from IoT sensors. In another example, the method can include identifying the impact of a request, and querying a user when an impact seems illogical, as described above.

The method can further include substituting rhyming or similar sounding words and determining possible requested actions. The method can also include suggesting alternative requests or suggesting ignoring a request based on a confidence factor that the request is incorrect.

In embodiments and examples according to the present disclosure, a method includes determining when a request to a voice activated system is not the intended request by the requester, for example, A request that is not normally asked from the individual, a change in voice tone during or after the request; a reversal of the original request and initiation of a new request after an original request is processed; a request that is illogical based on readings from other sensors; a request when changing a word in the request to a word that sounds similar to could change the meaning of the request (e.g., turn off all lights vs hall lights). The method can ascertain, based on the probability that a request is not intended to be executed, the request could be ignored by the listening device or alternative actions could be suggested through the AI device. Thereby, the embodiments of the present disclosure can determine by corrective actions from an individual or illogical actions based on monitoring of sensors, or requests that the requester immediately or frequently corrects or reverses.

The flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
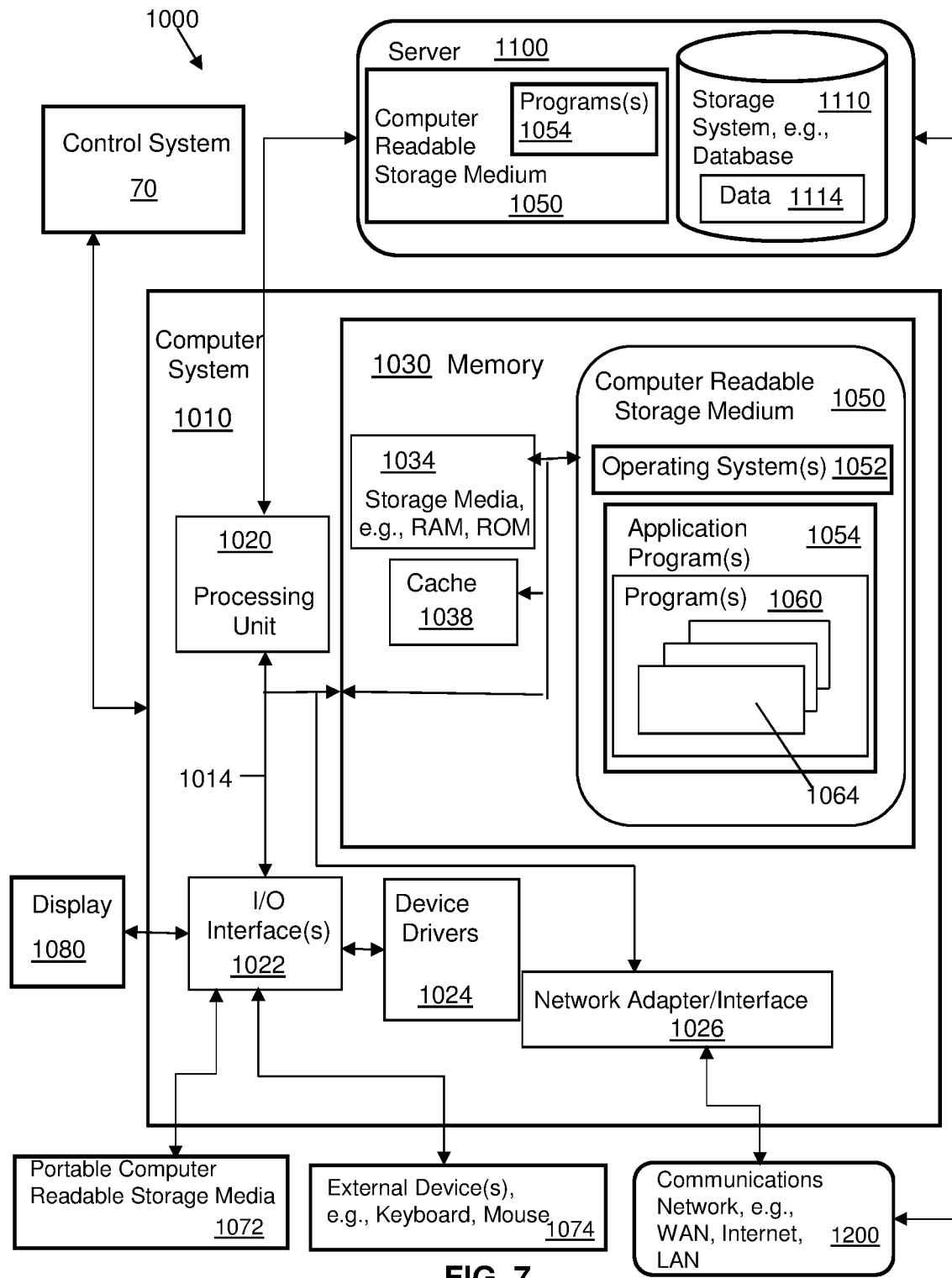
FIG. 7 is a schematic block diagram depicting a computer system according to an embodiment of the disclosure which may be incorporated, all or in part, in one or more computers or devices shown in FIG. 1, and cooperates with the systems and methods shown in FIGS. 1-6.

Referring to FIG. 7, a system or computer environment 1000 includes a computer system 1010 shown in the form of a generic computing device. The method 100, for example, may be embodied in a program 1060, including program instructions, embodied on a computer readable storage device, or computer readable storage medium, for example, generally referred to as memory 1030 and more specifically, computer readable storage medium 1050. Such memory and/or computer readable storage media includes non-volatile memory or non-volatile storage. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, the system or computer environment 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure. It is also understood that the control system 70 can include all or part of the computer system 1010 and its components, and/or the control system can communicate with all or part of the computer system 1010 and its components as a remote computer system, to achieve the control system functions described in the present disclosure. It is also understood that the one or more computers or computer systems shown in FIG. 1 similarly can include all or part of the computer system 1010 and its components, and/or the one or more computers can communicate with all or part of the computer system 1010 and its components as a remote computer system, to achieve the computer functions described in the present disclosure.

One or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

Figure 8:
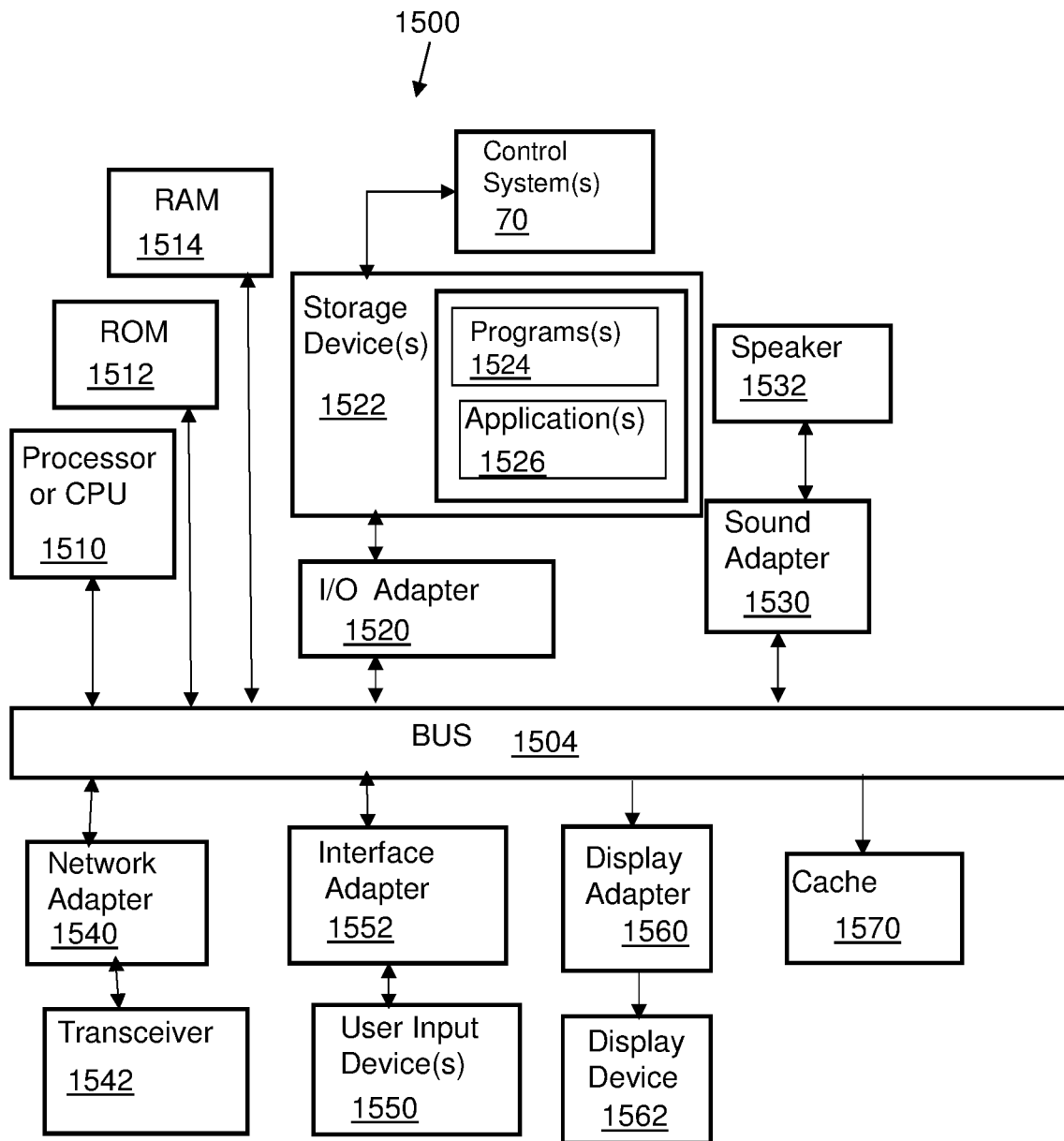
FIG. 8 is a schematic block diagram of a system depicting system components interconnected using a bus. The components for use, in all or in part, with the embodiments of the present disclosure, in accordance with one embodiment of the present disclosure.

Referring to FIG. 8, an example system 1500 for use with the embodiments of the present disclosure is depicted. The system 1500 includes a plurality of components and elements connected via a system bus 1504 (also referred to as a bus). At least one processor (CPU) 1510, is connected to other components via the system bus 1504. A cache 1570, a Read Only Memory (ROM) 1512, a Random Access Memory (RAM) 1514, an input/output (I/O) adapter 1520, a sound adapter 1530, a network adapter 1540, a user interface adapter 1552, a display adapter 1560 and a display device 1562, are also operatively coupled to the system bus 1504 of the system 1500.

One or more storage devices 1522 are operatively coupled to the system bus 1504 by the I/O adapter 1520. The storage device 1522, for example, can be any of a disk storage device (e.g., a magnetic or optical disk storage device), a solid state magnetic device, and so forth. The storage device 1522 can be the same type of storage device or different types of storage devices. The storage device can include, for example, but not limited to, a hard drive or flash memory and be used to store one or more programs 1524 or applications 1526. The programs and applications are shown as generic components and are executable using the processor 1510. The program 1524 and/or application 1526 can include all of, or part of, programs or applications discussed in the present disclosure, as well vice versa, that is, the program 1524 and the application 1526 can be part of other applications or program discussed in the present disclosure. The storage device can communicate with the control system 70 which has various functions as described in the present disclosure.

A speaker 1532 is operatively coupled to system bus 1504 by the sound adapter 1530. A transceiver 1542 is operatively coupled to system bus 1504 by the network adapter 1540. A display 1562 is operatively coupled to the system bus 1504 by the display adapter 1560.

One or more user input devices 1550 are operatively coupled to the system bus 1504 by the user interface adapter 1552. The user input devices 1550 can be, for example, any of a keyboard, a mouse, a keypad, an image capture device, a motion sensing device, a microphone, a device incorporating the functionality of at least two of the preceding devices, and so forth. Other types of input devices can also be used, while maintaining the spirit of the present invention. The user input devices 1550 can be the same type of user input device or different types of user input devices. The user input devices 1550 are used to input and output information to and from the system 1500.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
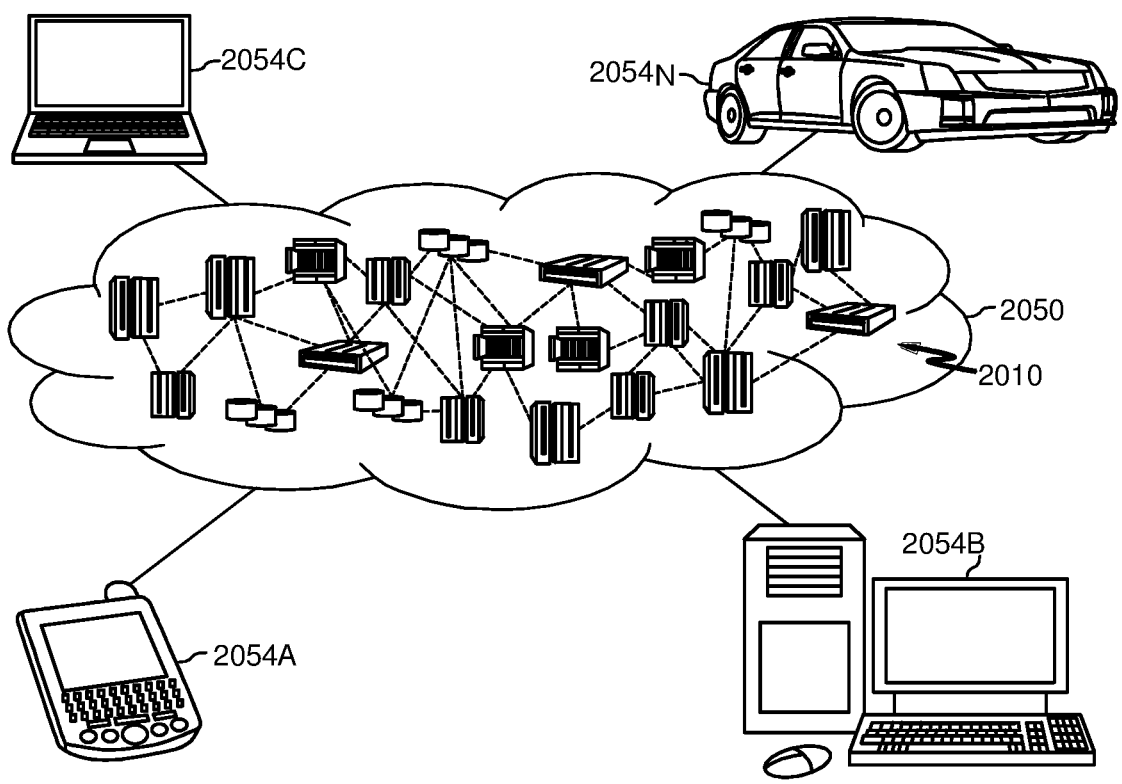
FIG. 9 is a block diagram depicting a cloud computing environment according to an embodiment of the present invention.

Referring now to FIG. 9, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 9 are intended to be illustrative only and that computing nodes 2010 and cloud computing environment 2050 can communicate with any type of computerized device over any type of network and/or network addressable connection (e.g., using a web browser).

Figure 10:
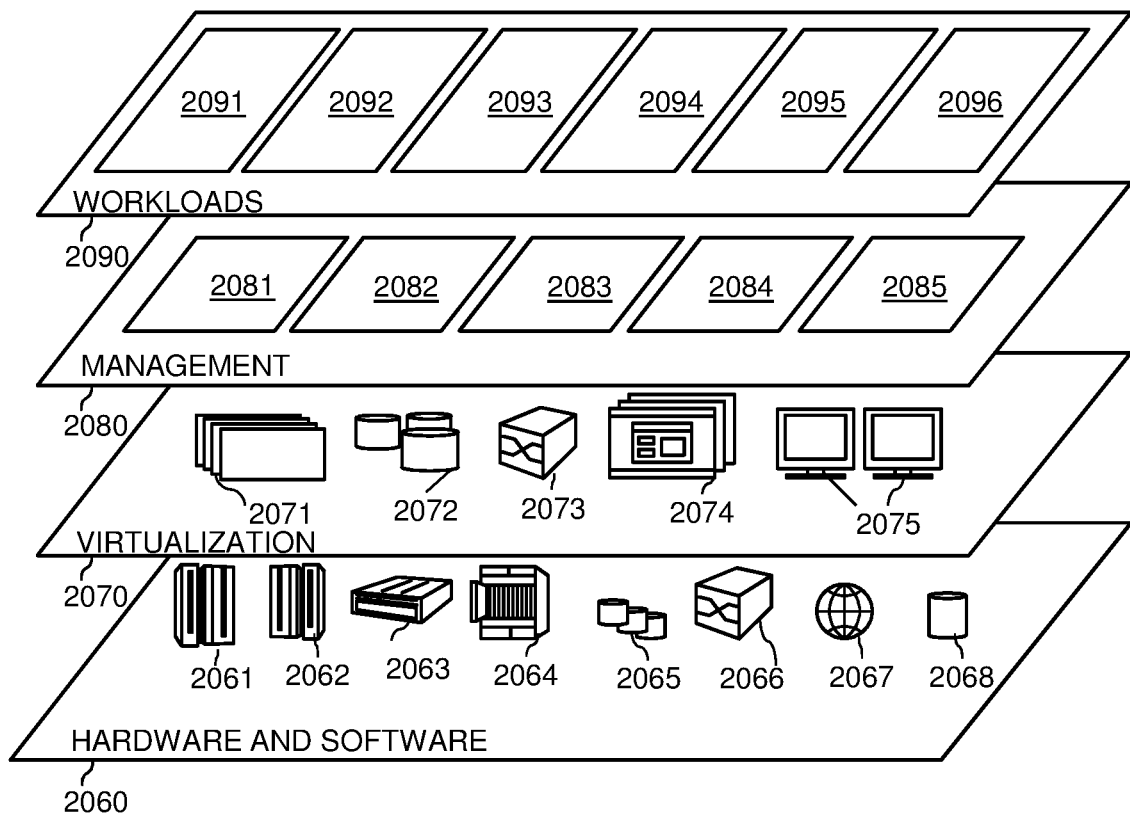
FIG. 10 is a block diagram depicting abstraction model layers according to an embodiment of the present invention.

Referring now to FIG. 10, a set of functional abstraction layers provided by cloud computing environment 2050 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and identifying a possibly incorrect or misunderstood voice command or request from a user using an AI system 2096.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for analyzing a voice command or request from a user, received at an Artificial Intelligence (AI) system, for identifying a possibly incorrect or misunderstood voice command or request, comprising:

identifying a first user and associating the first user to a first user profile, in response to receiving an audio input at an AI system from the first user, the AI system including a control system and the control system storing the first user profile which includes data about the user in a knowledge corpus wherein the knowledge corpus includes historical data for the first user of a plurality of users;

analyzing content of the audio input to identify a question or command;

identifying a possible defect or error, in whole or in part, of the question or the command, based on the first profile of the first user and the knowledge corpus;

determining a response by the AI system based on the analysis of the content and the user profile for the first user;

generating possible alternative content, in whole or in part, for the question or the command when the determination for the response based on the analysis includes alternative content;

communicating the response including the possible alternative content to the first user;

comparing a command or request with the historical data of the first user to identify a previous similar command or request in the historical data based on contextual information of the historical data and the command or request;

determining an impact of executing the command or request on the previous similar command or request;

generating a probability score for the impact of executing the command or request on the previous similar command or request based on the historical data;

determining whether to query the user for more information about the command or request based on the impact probability score; and querying the user to confirm execution of the command or request when the probability score meets or exceeds a threshold.

2. The method of claim 1, further comprising:
receiving registration data from the first user for registering the first user with the AI system using the control system.

3. The method of claim 2, wherein the registration data includes voice prints and/or camera video data.

4. The method of claim 1, wherein the historical data includes historical communications with the control system for the first user and/or communications with associated devices which share information with the AI system.

5. The method of claim 1, further comprising:
analyzing a probability of all or part of the content being incorrect or defective in some manner using the historical data in the first user profile; and
assigning a confidence factor for the command or request based on the probability analysis.

6. The method of claim 5, wherein the response includes a suggestion to ignore the question or command based on the confidence factor.

7. The method of claim 1, wherein the possible alternative content includes substituting a target one or more words in the content with alternative words.

8. The method of claim 7, wherein the substitute one or more words
include rhyming or a similar sounding words in comparison to the target one or more words.

9. The method of claim 1, wherein the historical data includes Internet of Things (IoT) data received from IoT devices.

10. The method of claim 1, wherein the historical data includes Internet of Things (IoT) data received from IoT devices, and the method further comprising:
comparing a command or request with the historical data of the first user to identify a previous similar command or request in the historical data based on contextual information of the historical data and the command or request;
identifying a pattern of requests using the historical data;
identifying when the command or request does not fit the pattern of requests;
determining an alternative action or alternative command or request based on the identification of the pattern of request and the identifying when the command or request does not fit the pattern of requests; and
communicating the alternative action to the user.

11. The method of claim 1, further comprising:
receiving data from Internet of Things (IoT) devices, and the IoT data being included in the historical data:
identifying, based on the historical data including the IoT data an illogical command, the illogical command not meeting requirements for congruity between the request or command and the historical data including the IoT data;
determining an alternative action and/or a response asking for clarification using the AI system; and
communicating the alternative action and/or the response asking for clarification to the user.

12. The method of claim 1, further comprising:
receiving a plurality of questions or commands at an AI system, from the plurality of users, respectively, identifying each of the users of the plurality of users and associating each user with their respective user profile of a plurality of profiles;
analyzing content of each of the questions or commands;
determining a response for each of the questions or commands based on the analysis of the content for each of the questions or command and the associated user profile of the plurality of profiles;
generating possible alternative content for one or more of the plurality of questions or commands when the determination for the response for the one or more of the questions or commands based on the analysis includes alternative content; and
communicating the responses to each of the respective users in response to the plurality of questions or commands, respectively.

13. The method of claim 12, wherein the AI system sends a text and/or a chatbot to a respective device for each of the respective users based on the response for each of the questions or commands.

14. The method of claim 1, wherein the AI system includes a listening device, and a speaker for audible communication using a simulated voice.

15. A system for analyzing a voice command or request from a user, received at an Artificial Intelligence (AI) system, for identifying a possibly incorrect or misunderstood voice command or request, which comprises:
a computer system comprising: a computer processor, a computer-readable storage medium, and program instructions stored on the computer-readable storage medium being executable by the processor, to cause the computer system to:
identify a first user and associating the first user to a first user profile, in response to receiving an audio input at an AI system from the first user, the AI system including a control system and the control system storing the first user profile which includes data about the user in a knowledge corpus wherein the knowledge corpus includes historical data for the first user of a plurality of users;
analyze content of the audio input to identify a question or command;
identify a possible defect or error, in whole or in part, of the question or the command, based on the first profile of the first user and the knowledge corpus;

determine a response by the AI system based on the analysis of the content and the user profile for the first user;
generate possible alternative content, in whole or in part, for the question or the command when the determination for the response based on the analysis includes alternative content;
communicate the response including the possible alternative content to the first user;
compare a command or request with the historical data of the first user to identify a previous similar command or request in the historical data based on contextual information of the historical data and the command or request;
determine an impact of executing the command or request on the previous similar command or request;
generate a probability score for the impact of executing the command or request on the previous similar command or request based on the historical data;
determine whether to query the user for more information about the command or request based on the impact probability score; and
query the user to confirm execution of the command or request when the probability score meets or exceeds a threshold.

16. The system of claim 15, further comprising:
receiving registration data from the first user for registering the first user with the AI system using the control system.

17. The system of claim 16, wherein the historical data includes historical communications with the control system for the first user and/or communications with associated devices which share information with the AI system.

18. A computer program product for analyzing a voice command or request from a user, received at an Artificial Intelligence (AI) system, for identifying a possibly incorrect or misunderstood voice command or request, the computer program product comprising a computer readable storage medium having program instructions embodied therewith, wherein the computer readable storage medium is not a transitory signal per se, the program instructions executable by a computer to cause the computer to perform a method, comprising:
identifying a first user and associating the first user to a first user profile, in response to receiving an audio input at an AI system from the first user, the AI system including a control system and the control system storing the first user profile which includes data about the user in a knowledge corpus wherein the knowledge corpus includes historical data for the first user of a plurality of users;
analyzing content of the audio input to identify a question or command;
identifying a possible defect or error, in whole or in part, of the question or the command, based on the first profile of the first user and the knowledge corpus;
determining a response by the AI system based on the analysis of the content and the user profile for the first user;
generating possible alternative content, in whole or in part, for the question or the command when the determination for the response based on the analysis includes alternative content;
communicating the response including the possible alternative content to the first user;
comparing a command or request with the historical data of the first user to
identify a previous similar command or request in the historical data based on contextual information of the historical data and the command or request;
determining an impact of executing the command or request on the previous similar command or request;
generating a probability score for the impact of executing the command or request on the previous similar command or request based on the historical data;
determining whether to query the user for more information about the command or request based on the impact probability score; and
querying the user to confirm execution of the command or request when the probability score meets or exceeds a threshold.

19. The computer program product of claim 18, further comprising:
receiving registration data from the first user for registering the first user with the AI system using the control system.

20. A computer-implemented method for analyzing a voice command or request from a user, received at an Artificial Intelligence (AI) system, for identifying a possibly incorrect or misunderstood voice command or request, comprising:
identifying a first user and associating the first user to a first user profile, in response to receiving an audio input at an AI system from the first user, the AI system including a control system and the control system storing the first user profile which includes data about the user in a knowledge corpus wherein the knowledge corpus includes historical data for the first user of a plurality of users, wherein the historical data includes Internet of Things IoT) data received from IoT devices;
analyzing content of the audio input to identify a question or command;
identifying a possible defect or error, in whole or in part, of the question or the command, based on the first profile of the first user and the knowledge corpus;
determining a response by the AI system based on the analysis of the content and the user profile for the first user;
generating possible alternative content, in whole or in part, for the question or the command when the determination for the response based on the analysis includes alternative content;
communicating the response including the possible alternative content to the first user;
comparing a command or request with the historical data of the first user to identify a previous similar command or request in the historical data based on contextual information of the historical data and the command or request;
identifying a pattern of requests using the historical data;
identifying when the command or request does not fit the pattern of requests;
determining an alternative action or alternative command or request based on the identification of the pattern of request and the identifying when the command or request does not fit the pattern of requests; and
communicating the alternative action to the user.

* * * * *